(12) United States Patent
Watanabe et al.

(10) Patent No.: US 9,350,571 B2
(45) Date of Patent: May 24, 2016

(54) DIFFERENTIAL SIGNAL TRANSMISSION CABLE AND CABLE WITH CONNECTOR

(71) Applicant: Hitachi Metals, Ltd., Tokyo (JP)

(72) Inventors: Haruyuki Watanabe, Hitachi (JP); Minoru Oikawa, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/178,455

(22) Filed: Feb. 12, 2014

(65) Prior Publication Data

US 2015/0003540 A1  Jan. 1, 2015

(30) Foreign Application Priority Data

Jun. 28, 2013 (JP) ................. 2013-136442

(51) Int. Cl.
*H01B 7/29* (2006.01)
*H04L 25/02* (2006.01)
*H01B 11/00* (2006.01)
*H01B 11/10* (2006.01)

(52) U.S. Cl.
CPC .......... *H04L 25/0272* (2013.01); *H01B 11/002* (2013.01); *H01B 11/1016* (2013.01)

(58) Field of Classification Search
CPC .......... H01B 11/1025; H01B 11/1016; H01B 11/1813; H05K 1/0213; Y10T 29/49123
USPC ................ 174/109, 28, 102 R, 36, 108
See application file for complete search history.

(56) References Cited

U.S. PATENT DOCUMENTS

| | | | | |
|---|---|---|---|---|
| 2,391,037 A | * | 12/1945 | Shafer, Jr. ........... | 174/102 SP |
| 4,374,299 A | * | 2/1983 | Kincaid ............ | 174/36 |
| 5,030,794 A | * | 7/1991 | Schell et al. .......... | 174/36 |
| 5,144,098 A | * | 9/1992 | VanDeusen ............ | 174/36 |
| 5,416,268 A | * | 5/1995 | Ellis ................. | 174/36 |
| 5,574,250 A | * | 11/1996 | Hardie et al. ......... | 174/36 |
| 6,259,019 B1 | * | 7/2001 | Damilo et al. ........ | 174/36 |
| 6,686,537 B1 | * | 2/2004 | Gareis et al. ......... | 174/36 |
| 2004/0026111 A1 | * | 2/2004 | Vuotilainen ......... | 174/102 R |
| 2010/0276176 A1 | * | 11/2010 | Amato ............... | 174/110 R |
| 2010/0294557 A1 | * | 11/2010 | Cases et al. .......... | 174/350 |
| 2012/0186850 A1 | | 7/2012 | Sugiyama et al. | |

FOREIGN PATENT DOCUMENTS

JP    2012-169251 A    9/2012

OTHER PUBLICATIONS

Nagahashi (WO2012157771) English translation Published Nov. 22, 2012.*

* cited by examiner

*Primary Examiner* — Steven T Sawyer
(74) *Attorney, Agent, or Firm* — Crowell & Moring LLP

(57) ABSTRACT

A differential signal transmission cable includes: two signal conductors; an insulator for covering these signal conductors; and a shield tape wound around the insulator in longitudinal wrapping. In the differential signal transmission cable, both ends of the shield tape in a direction of the winding around the insulator have a first overlapping region and a second overlapping region which overlap each other, and the first overlapping region of the shield tape is covered with the second overlapping region. In a tangent line of two tangent lines of a first signal conductor which is orthogonal to a line passing through centers of the signal conductors, when the tangent line positioned at radially outside of the first signal conductor is set to be a first tangent line, an end of the first overlapping region is positioned at outside of the first tangent line.

18 Claims, 4 Drawing Sheets

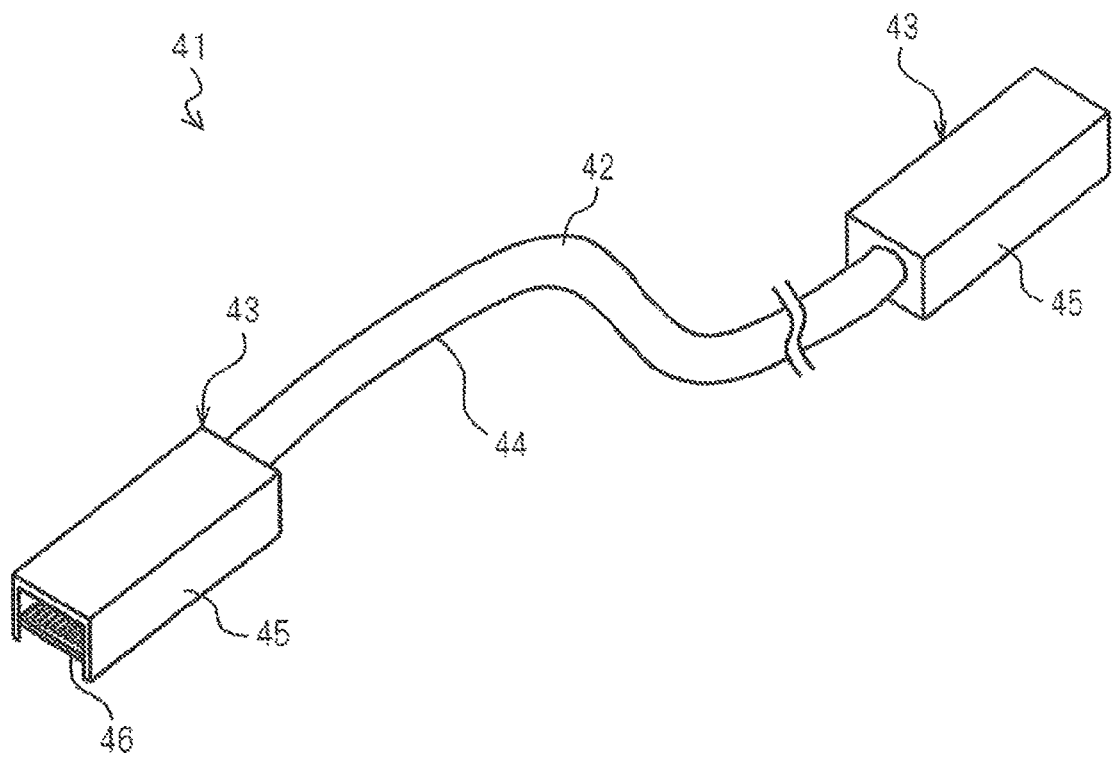

DIFFERENTIAL SIGNAL TRANSMISSION CABLE AND CABLE WITH CONNECTOR

CROSS-REFERENCE TO RELATED APPLICATION

The present application claims priority from Japanese Patent Application No. 2013-136442 filed on Jun. 28, 2013, the content of which is hereby incorporated by reference into this application.

TECHNICAL FIELD OF THE INVENTION

The present invention relates to a differential signal transmission cable and a cable with a connector for transmitting two or more signals whose phases are different from each other.

BACKGROUND OF THE INVENTION

The differential interface standard (for example, LVDS (Low Voltage Differential Signaling)) is adopted to devices such as a server, a router, and a storage in which high-speed digital signals of several Gbit/s or higher are handled, and differential signals are transmitted by using a differential signal transmission cable between devices or between circuit boards in the device. The differential signals have such an advantage as high noise immunity to exogenous noises while achieving low voltage of a system power supply.

A general differential signal transmission cable is provided with: a pair of signal conductors arranged in parallel to each other; an insulator for covering these signal conductors; a shield tape wound around the insulator; and a holding tape wound around the shield tape. To the signal conductors, a plus-side (positive) signal and a minus-side (negative) signal, whose phases are reversed by 180 degrees, are transmitted, respectively. A potential difference between these two signals (the plus-side signal and the minus-side signal) becomes a signal level, and the signal level can be identified on a reception side as, for example, "High" when the potential difference is positive and "Low" when it is negative.

Here, the shield tape has a sheet-shaped base member and a metal conductor layer formed on one surface of the base member. The shield tape is wound around the insulator in longitudinal wrapping so that the metal conductor layer faces outside (see Japanese Patent Application Laid-Open Publication No. 2012-169251 (Patent Document 1)).

SUMMARY OF THE INVENTION

The shield tape wound around the insulator in the longitudinal wrapping has both ends overlapping each other in the winding direction. Therefore, a gap due to a thickness of the shield tape is caused between the insulator and the shield tape. More specifically, the gap is caused between an outer circumferential surface of the insulator and an inner surface of the shield tape in vicinity of one end of the shield tape. This gap causes deterioration in transmission property such as increase in skew and increase in a conversion volume of the differential phase to/from the common phase (differential/common-phase conversion).

It is an object of the present invention to suppress the deterioration in the transmission property of the differential signal transmission cable due to the gap caused between the insulator and the shield tape.

The differential signal transmission cable of the present invention includes: two signal conductors; an insulator for covering these signal conductors; and a shield tape wound around the insulator in longitudinal wrapping. Both ends of the shield tape in a direction of the winding around the insulator have a first overlapping region and a second overlapping region which overlap each other, and the first overlapping region of the shield tape is covered with the second overlapping region thereof. In a tangent line of two tangent lines of a first signal conductor which is orthogonal to a line passing through the centers of the two signal conductors, when the tangent line positioned at radially outside of the first signal conductor is set to be a first tangent line, an end of the first overlapping region is positioned at outside of the first tangent line.

The cable with the connector of the present invention includes: a transmission cable having a plurality of differential signal transmission cables; and connectors provided on both ends of the transmission cable. Each of the differential signal transmission cables includes: two signal conductors; an insulator for covering these signal conductors; and a shield tape wound around the insulator in longitudinal wrapping. Both ends of the shield tape in a direction of the winding around the insulator have a first overlapping region and a second overlapping region which overlap each other, and the first overlapping region of the shield tape is covered with the second overlapping region thereof. In a tangent line of two tangent lines of a first signal conductor which is orthogonal to a line passing through the centers of the two signal conductors, when the tangent line positioned at radially outside of the first signal conductor is set to be a first tangent line, an end of the first overlapping region is positioned at outside of the first tangent line.

As one aspect of the present invention, in a tangent line of two tangent lines of a second signal conductor which is orthogonal to the line passing through the centers of the two signal conductors, when the tangent line positioned at radially outside of the second signal conductor is set to be a second tangent line, an end of the second overlapping region is positioned at outside of the second tangent line.

As another aspect of the present invention, at a midpoint of a line segment connecting between the centers of the two signal conductors, the first overlapping region and the second overlapping region cross a line which is orthogonal to the line segment.

As still another aspect of the present invention, the first overlapping region and the second overlapping region does not cross the line which passes through the centers of the two signal conductors.

As still another aspect of the present invention, the insulator collectively covers the two signal conductors.

As still another aspect of the present invention, a gap between the insulator and the shield tape is formed in only the end of the first overlapping region.

As still another aspect of the present invention, a drain wire is devoid between the insulator and the shield tape.

As still another aspect of the present invention, the cable further has an insulating tape wound around the shield tape in spiral wrapping.

As still another aspect of the present invention, a transmission rate of 10 Gbit/s or larger is used.

According to the present invention, the deterioration in the transmission property of the differential signal transmission cable due to the gap caused between the insulator and the shield tape is suppressed.

BRIEF DESCRIPTIONS OF THE DRAWINGS

FIG. 4 is a perspective view illustrating one example of a cable with a connector to which the present invention is applied.

DESCRIPTIONS OF THE PREFERRED EMBODIMENTS

Figure 1A:
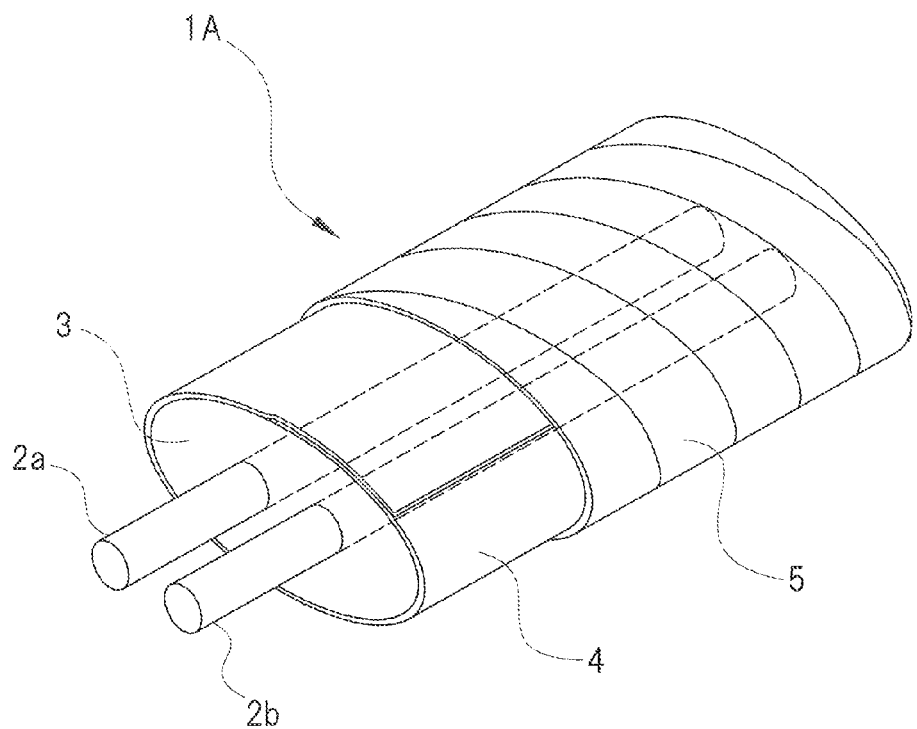
FIG. 1A is a partial cross-sectional perspective view illustrating an embodiment of a differential signal transmission cable according to the present invention.

Hereinafter, exemplary embodiments of the present invention will be explained in detail with reference to the drawings. As illustrated in FIG. 1A, a differential signal transmission cable 1A according to the present embodiment includes a first signal conductor 2a and a second signal conductor 2b. That is, the differential signal transmission cable 1A includes a pair of signal conductors 2a and 2b. A plus-side (positive) signal is transmitted to either one of the pair of signal conductors 2a and 2b, and a minus-side (negative) signal is transmitted to the other of the pair of signal conductors 2a and 2b. Each of the signal conductors 2a and 2b is made of an annealed copper wire (silver plated copper wire) whose surface is subjected to silver plating treatment and whose cross-sectional surface is circular. The pair of signal conductors 2a and 2b are covered together with a common insulator 3.

The insulator 3 is made of, for example, foamed polyethylene (Expanded Poly-Ethylene), and a shape of a cross-sectional surface (horizontal surface) thereof which is orthogonal to a longitudinal direction of the differential signal transmission cable 1A is substantially ellipsoidal. The shape of the cross-sectional surface of the insulator 3 will be described in detail later.

The insulator 3 holds these signal conductors 2a and 2b so that the first signal conductor 2a and the second signal conductor 2b are arranged in parallel to each other at a predetermined interval. Wall thicknesses of the insulator 3 in peripheries of the signal conductors 2a and 2b are substantially equal to each other. In the present embodiment, a melting temperature of the foamed polyethylene that is the material of the insulator 3 is set to 110[° C.] to 120[° C].

Around the insulator 3, a shield tape 4 for suppressing influence of the exogenous noises is wound. Although illustration is omitted, the shield tape 4 has a double structure formed of a sheet-shaped base member and a metal conductor layer formed on one surface of the base member. The metal conductor layer is made of, for example, copper foil.

The shield tape 4 is wound around the insulator 3 in longitudinal wrapping so as to have both ends overlapping each other in a direction of the winding around the insulator 3. Hereinafter, when an "end" of the shield tape 4 or "both ends" of the shield tape 4 is described, they mean an end of the shield tape 4 in the direction of the winding around the insulator 3 or both ends of the shield tape 4 in the same direction unless otherwise state.

Figure 1B:
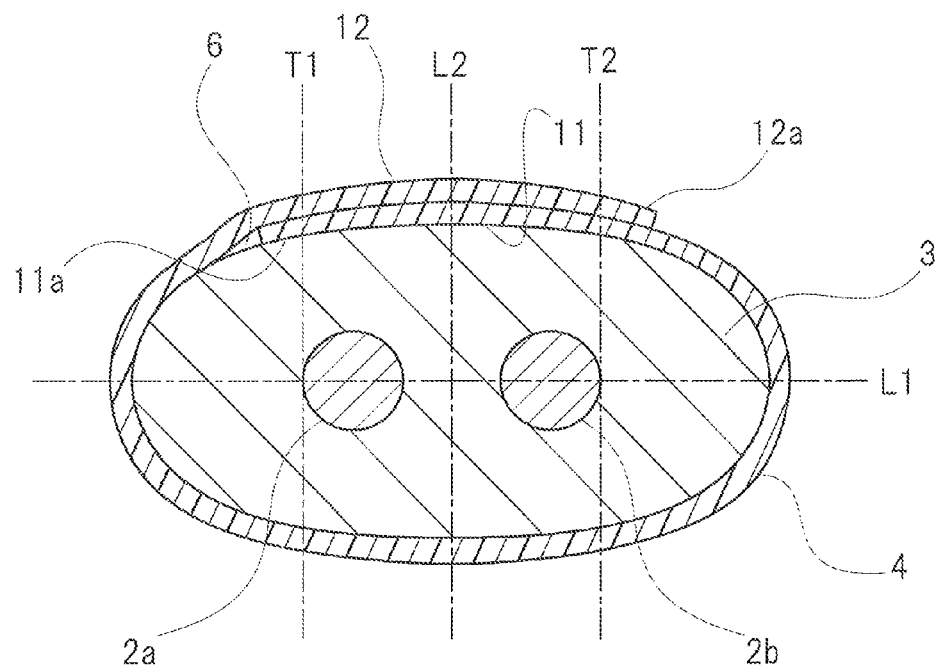
FIG. 1B is a partial enlarged cross-sectional view of FIG. 1A.

As described above, the shield tape 4 is wound around the insulator 3 in longitudinal wrapping so that both ends thereof overlap each other. Therefore, as illustrated in FIG. 1B, both ends of the shield tape 4 have the first overlapping region 11 and the second overlapping region 12 which overlap each other. In other words, one of two regions overlapping each other among all regions of the shield tape 4 is the first overlapping region 11, and the other is the second overlapping region 12.

Further, the first overlapping region 11 of the shield tape 4 is covered with the second overlapping region 12 thereof. In other words, the second overlapping region 12 of the shield tape 4 is layered on the first overlapping region 11 thereof. Further, in other words, the second overlapping region 12 of the shield tape 4 raises over the first overlapping region 11 thereof. As a result, an inner surface of the shield tape 4 separates from an outer circumferential surface of the insulator 3 in vicinity of an end 11a of the first overlapping region 11 so as to cause a gap 6 between the insulator 3 and the shield tape 4. This gap 6 causes the deterioration in the transmission property such as the increase in skew and the increase in the conversion volume of the differential/common-phase conversion as described above. For example, a transmission rate of 10 Gbit/s or larger is used, there is a problem of yield reduction due to influence of the deterioration in transmission property caused by this gap 6. Note that, in the present embodiment, the insulator 3 has a substantially-ellipsoidal cross-sectional surface shape, and collectively covers a pair of signal conductors 2a and 2b. Therefore, except for the gap 6 in the vicinity of the end 11a of the first overlapping region 11, a gap does not occur between the insulator 3 and the shield tape 4. Also, in the present embodiment, because a drain wire is devoid between the insulator 3 and the shield tape 4, the occurrence of the gap due to the drain wire is avoided.

Figure 2:
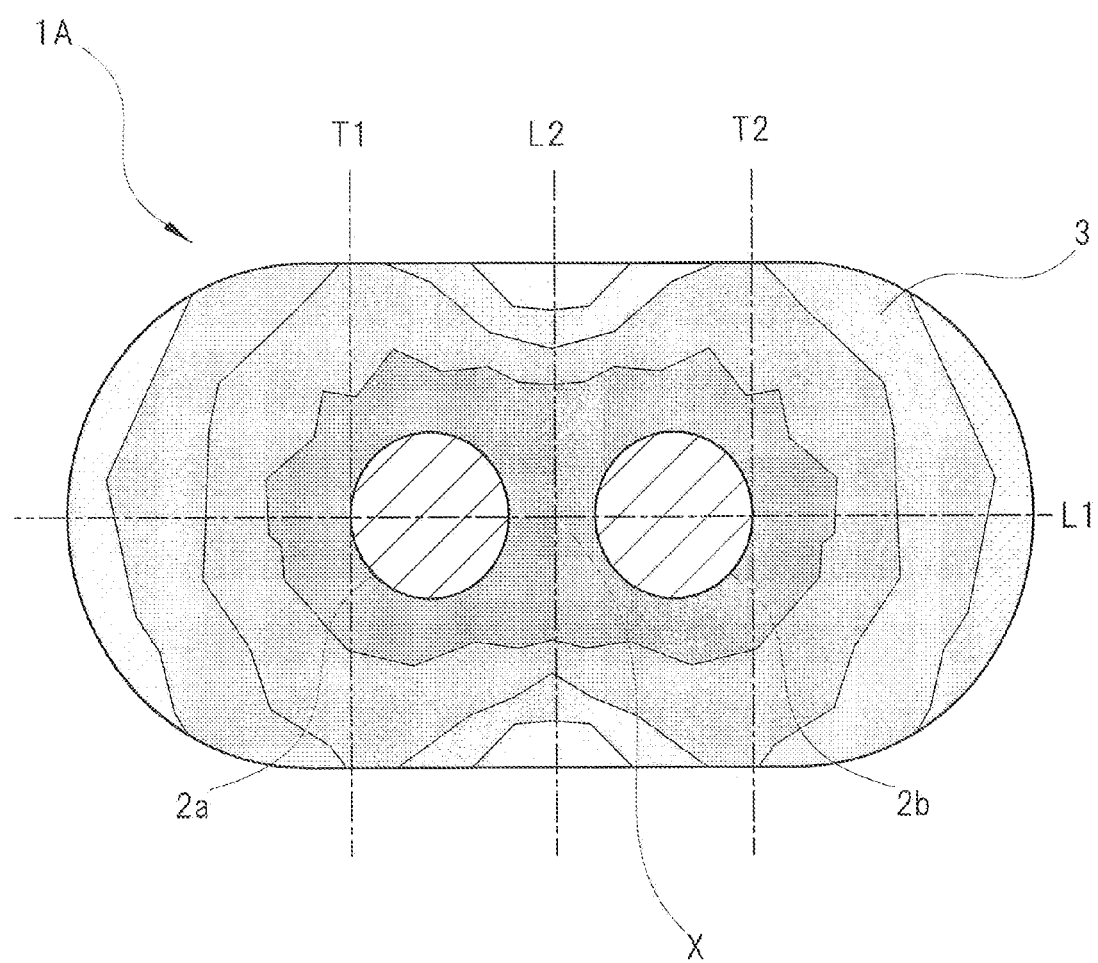
FIG. 2 is an explanatory view schematically illustrating electric field intensity distribution in the cross-sectional surface of the differential signal transmission cable illustrated in FIGS. 1A and 1B.

FIG. 2 is referenced. FIG. 2 is an explanatory view schematically illustrating electric field intensity distribution at inside of a horizontal cross-sectional surface of the differential signal transmission cable 1A. In FIG. 2, the electric field intensity is illustrated depending on color depth. More specifically, in the drawing, a portion with a deep color indicates a high electric field intensity, and a portion with a shallow color indicates a low electric field intensity.

Here, a line passing through the centers of the two signal conductors 2a and 2b is defined as "line L1". At a midpoint of a line segment connecting between the centers of the two signal conductors 2a and 2b, a line which is orthogonal to the line segment is defined as "line L2". Also, an intersection between the line L1 and the line L2 is defined as "center X". Note that the line segment connecting between the centers of the two signal conductors 2a and 2b is obviously a part of the line L1. Moreover, in the following explanation, the line L1 is referred to as "long axis", and the line L2 is referred to as "short axis" in some cases.

Further, in one tangent line of two tangent lines of the first signal conductor 2a, which are in orthogonal to the line L1, the one tangent line positioned at radially outside of the first signal conductor 2a is defined as "first tangent line T1". Also, in one tangent line of two tangent lines of the second signal conductor 2b, which are in orthogonal to the line L1, the one tangent line positioned at radially outside of the second signal conductor 2b is defined as "second tangent line T2".

With reference to FIG. 2 again based on assumption of the above-described definitions, it is found that the electric field intensity is lower as a position is further from the center X. More specifically, high electric field intensity is distributed more between the first signal conductor 2a and the second signal conductor 2b and in peripheries of these signal conductor 2a and 2b. On the other hand, both outsides in a direction of the long axis have a region with the low electric field intensity. More particularly, each of the outside of the first tangent line T1 in the direction of the long axis and the outsides of the second tangent line T2 in the direction of the long axis has the region with the low electric field intensity. Note that the term of "the outside in the direction of the long axis" means a portion in a direction going along the long axis and away from the center X. That is, on a sheet of FIG. 2, the outside in the direction of the long axis is a portion in a direction going leftward from the center X in region on a left side of the short axis (line L2), and the outside in the direction of the long axis is a portion in a direction going rightward from the center X in a region on a right side of the short axis (line L2).

Here, when the gap 6 illustrated in FIG. 1B is positioned in a region with the high electric field intensity, the influence of the gap 6 on the transmission property of the differential signal transmission cable 1A is large. That is, when the gap 6 is positioned in the region with the high electric field intensity, the deterioration in the transmission property of the differential signal transmission cable 1A is significant.

Accordingly, as illustrated in FIG. 1B, in the differential signal transmission cable 1A according to the present embodiment, the shield tape 4 is wound so that the end 11a of the first overlapping region 11 of the shield tape 4 is positioned at outside (on a left side) of the first tangent line T1 in the direction of the long axis. As a result, the second overlapping region 12 of the shield tape 4 raises over the first overlapping region 11 thereof, so that the caused gap 6 is also positioned at outside (on the left side) of the first tangent line T1 in the direction of the long axis. That is, the gap 6 is positioned in the region with the relatively-low electric field intensity at inside of the horizontal cross-sectional surface of the differential signal transmission cable 1A. Therefore, the influence of the gap 6 on the transmission property of the differential signal transmission cable 1A is lower than that in a case that the gap 6 is positioned at inside (on a right side) of the first tangent line T1 in the direction of the long axis, more specifically, positioned between the first tangent line T1 and the second tangent line T2.

The above-described function effect is obtained similarly in an embodiment in which the gap 6 is arranged at outside (on a right side) of the second tangent line T2 in the direction of the long axis. That is, an embodiment in which the end 11a of the first overlapping region 11 of the shield tape 4 illustrated in FIG. 1B is positioned at outside (on the right side) of the second tangent line T2 in the direction of the long axis is also included in a scope of the present invention. In order to position the end 11a of the first overlapping region 11 to be at outside (on the right side) of the second tangent line T2 in the direction of the long axis, a dimension of the shield tape 4 in a circumferential direction (winding direction) is shortened. That is, a degree of the overlapping between the first overlapping region 11 and the second overlapping region 12 is reduced.

However, when the end 11a of the first overlapping region 11 is positioned at outside (on the right side) of the second tangent line T2 in the direction of the long axis, both of the end 11a of the first overlapping region 11 and the end 12a of the second overlapping region 12 are positioned at outside (on the right side) of the second tangent line T2 in the direction of the long axis, and therefore, symmetric property is reduced.

On the other hand, in the differential signal transmission cable 1A according to the present embodiment, the end 11a of the first overlapping region 11 is positioned at outside (on the left side) of the first tangent line T1 in the direction of the long axis, and the end 12a of the second overlapping region 12 is positioned at outside (on the right side) of the second tangent line T2 in the direction of the long axis. Therefore, the symmetric property of this case is higher than that in the case in which both of the two ends 11a and 12a unevenly exist at outside (on the left side or the right side) of one tangent line (the first tangent line T1 or the second tangent line T2), so that the further improvement of the transmission property can be expected.

Also, as illustrated in FIG. 1B, the first overlapping region 11 of the shield tape 4 extends beyond the short axis (the line L2) to the outside (the left side) of the first tangent line T1 in the direction of the long axis. On the other hand, the second overlapping region 12 of the shield tape 4 extends beyond the short axis (the line L2) to the outside (the right side) of the second tangent line T2 in the direction of the long axis. That is, the first overlapping region 11 and the second overlapping region 12 extend in opposite directions to each other so as to cross the line L2. In other words, a sufficient overlapping amount is secured between the first overlapping region 11 and the second overlapping region 12. Therefore, while the first overlapping region 11 and the second overlapping region 12 can be securely overlapped with each other, the shield tape 4 can be stably wound around the insulator 3.

On the other hand, the end 11a of the first overlapping region 11 extending beyond the short axis (the line L2) to the outside (the left side) of the first tangent line T1 in the direction of the long axis does not reach the long axis (the line L1). Also, the end 12a of the second overlapping region 12 extending beyond the short axis (the line L2) to the outside (the right side) of the second tangent line T2 in the direction of the long axis does not reach the long axis (the line L1). That is, the first overlapping region 11 and the second overlapping region 12 do not cross the long axis (the line L1). In this manner, the end 11a of the first overlapping region 11 and the end 12a of the second overlapping region 12 are prevented from being curled up.

With reference to FIG. 1A again, an insulating tape 5 serving as a holding tape is spirally wound around the shield tape 4 wound around the insulator 3 in longitudinal wrapping as described above. In the present embodiment, in order to prevent the loose of the insulating tape 5, an outer surface of the shield tape 4 and an inner surface of the insulating tape 5 which face each other are adhered to each other. Further, in order to easily peel the insulating tape 5 off if the peeling off is needed, the outer surface of the shield tape 4 and the inner surface of the insulating tape 5 are partially adhered. However, an embodiment in which the outer surface of the shield tape 4 and the inner surface of the insulating tape 5 are entirely adhered or an embodiment in which the outer surface of the shield tape 4 and the inner surface of the insulating tape 5 are not adhered may be adopted. Note that the end 12a of the second overlapping region 12 does not reach the long axis (line L1), and therefore, the curling up of the end 12a of the second overlapping region 12 is suppressed.

As explained above, the shape of the cross-sectional surface of the insulator 3 illustrated in FIG. 1B is not completely ellipsoidal but substantially ellipsoidal. More specifically, the shape of the cross-sectional surface of the insulator 3 is formed of combination of a plurality of circular arcs whose curvatures are different from each other. However, a differential signal transmission cable having an insulator whose cross-sectional shape is completely ellipsoidal is not excluded from the scope of the present invention. Also, a differential signal transmission cable having an insulator whose cross-sectional shape is a shape except for the ellipsoidal shape and the substantially ellipsoidal shape is not excluded from the scope of the present invention, either.

Figure 3A:
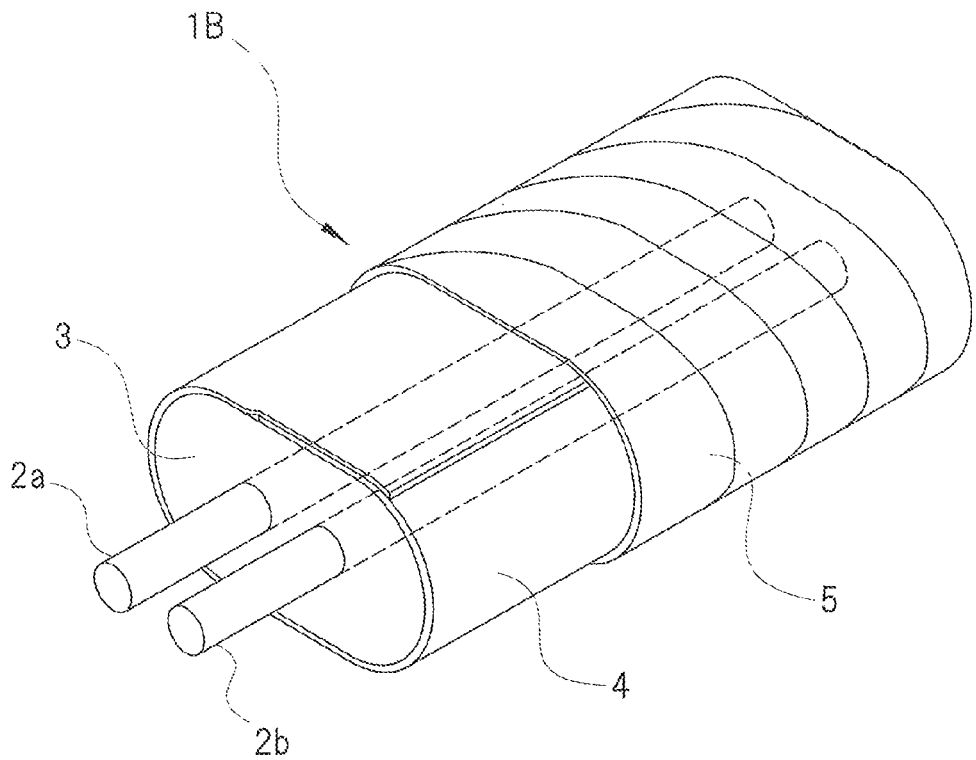
FIG. 3A is a partial cross-sectional perspective view illustrating another embodiment of the differential signal transmission cable according to the present invention.
Figure 3B:
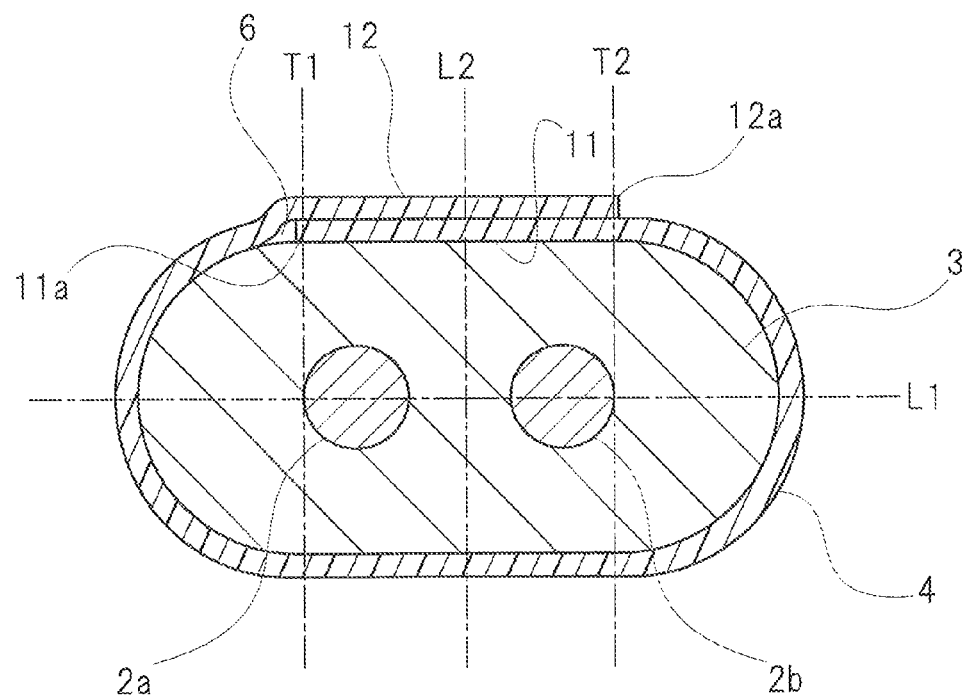
FIG. 3B is a partial enlarged cross-sectional view of FIG. 3A.

FIGS. 3A and 3B illustrate a differential signal transmission cable 1B having an insulator whose cross-sectional shape is the shape except for the ellipsoidal shape and the substantially ellipsoidal shape. A cross-sectional shape of the illustrated insulator 3 is formed of two circular arcs whose curvatures are constant and two lines connecting between these circular arcs.

In the differential signal transmission cable 1B illustrated in FIGS. 3A and 3B, the end 11a of the first overlapping region 11 of the shield tape 4 is positioned at outside (on the left side) of the first tangent line T1 in the direction of the long axis, and therefore, the gap 6 is also positioned at outside (on the left side) of the first tangent line T1 in the direction of the long axis.

Also, the end 11a of the first overlapping region 11 is positioned at outside (on the left side) of the first tangent line T1 in the direction of the long axis, and the end 12a of the second overlapping region 12 is positioned at outside (on the right side) of the second tangent line T2 in the direction of the long axis, so that the favorite symmetric property is obtained.

Further, while the first overlapping region 11 and the second overlapping region 12 extend in opposite directions to each other so as to cross the line L2, the end 11a of the first overlapping region 11 and the end 12a of the second overlapping region 12 do not reach the long axis (the line L1).

FIG. 4 is a perspective view of a cable 41 with a connector (Direct Attach Cable) having: a transmission cable 42; and connectors 43 provided on both ends of the transmission cable 42. The transmission cable 42 has a plurality of (for example, two, eight, or twenty-four) differential signal transmission cables 1. An outer circumferential part of the plurality of differential signal transmission cables 1 has a collective shield for collectively covering the plurality of differential signal transmission cables 1 and a jacket 44 made of an insulator for covering the collective shield. As the collective shield, a spiral wrapping form of the shield tape 4, a braded wire, or combination of them is used.

When the two differential signal transmission cables 1 are used as the transmission cable 42, one-channel data transmission/reception is possible. When the eight differential signal transmission cables 1 are used as the transmission cable 42, four-channel data transmission/reception is possible. In each differential signal transmission cable 1, signals are transmitted at a transmission rate of 10 Gbit/s or larger.

The connector 43 has: a connection substrate (embedded substrate) 46 electrically connected to the signal conductors 2a and 2b of the differential signal transmission cable 1; a connector package 45 for housing the connection substrate 46. Further, in order to achieve long-distance transmission of the electrical signals, a compensation circuit can be also mounted on at least either one of the connectors 43.

The present invention is not limited to the foregoing embodiments and various alterations can be made within the scope of the present invention. For example, an embodiment in which a solid type insulator is used instead of the foamed type insulator maybe adopted. Note that a dielectric constant of the foamed type insulator containing air bubbles is lower than a dielectric constant of the solid type insulator. Therefore, by using the foamed type insulator, reduction in a signal speed or others can be suppressed. When the foamed type insulator is used, note that an insulating skin layer is generally provided between the insulator and the shield tape. The insulating skin layer is formed, for example, into a substantially cylindrical shape made of an insulator such as poly tetra fluoro ethylene (PTFE), and plays a role of preventing deformation of the soft insulator before hardening in extrusion molding of the insulator or others.

Also, the signal conductor is not limited to Silver Plated Copper Wire, and, for example, an annealed copper wire (Tinned Annealed Copper Wire) whose cross-sectional surface is circular and whose surface is subjected to tin plating treatment may be used. Further, an annealed copper wire whose surface is not subjected to plating treatment may be used.

Further, an embodiment in which a second insulating tape is spirally wound around the insulating tape 5 illustrated in FIGS. 1A and 3A may be adopted. In this case, the second insulating tape may be spirally wound in a reverse direction to that of the insulating tape 5, or may be spirally wound in the same direction as that of the insulating tape 5.

What is claimed is:

1. A differential signal transmission cable comprising:
    two signal conductors;
    an insulator for covering the signal conductors; and
    a shield tape wound around the insulator in longitudinal wrapping,
    wherein the shield tape comprises a first overlapping region and a second overlapping region which overlap each other on both ends of the shield tape in a direction of the winding around the insulator, the first overlapping region is covered with the second overlapping region,
    a first tangent line tangent to a first signal conductor is orthogonal to a line passing through centers of the two signal conductors, the first tangent line is positioned at radially outside of the first signal conductor, and an end of the first overlapping region is positioned at outside of the first tangent line throughout the whole length of the cable,
    a third tangent line tangent to the first signal conductor and orthogonal to the first tangent line is positioned at radially outside of the first signal conductor on a side of the first signal conductor adjacent to the first and second overlapping regions,
    the end of the first overlapping region is positioned between the first tangent line and the third tangent line, and
    the two signal conductors are positioned radially outward of any other signal conductors in the differential signal transmission cable along the line passing through the centers of the two signal conductors.

2. The differential signal transmission cable according to claim 1,
    wherein, a second tangent line tangent to a second signal conductor is orthogonal to the line passing through the centers of the two signal conductors, the second tangent line is positioned at radially outside of the second signal conductor, and an end of the second overlapping region is positioned at outside of the second tangent line between the second tangent line and the third tangent line.

3. The differential signal transmission cable according to claim 1,
    wherein, at a midpoint of a line segment connecting between the centers of the two signal conductors, the first overlapping region and the second overlapping region cross a line which is orthogonal to the line segment.

4. The differential signal transmission cable according to claim 1,
    wherein the first overlapping region and the second overlapping region do not cross the line passing through the centers of the two signal conductors.

5. The differential signal transmission cable according to claim 1,
    wherein the insulator collectively covers the two signal conductors.

6. The differential signal transmission cable according to claim 5, wherein a gap between the insulator and the shield tape is formed in only the end of the first overlapping region.

7. The differential signal transmission cable according to claim 6,
wherein a drain wire is devoid between the insulator and the shield tape.

8. The differential signal transmission cable according to claim 1, further has an insulating tape wound around the shield tape in spiral wrapping.

9. The differential signal transmission cable according to claim 1,
wherein a transmission rate of 10 Gbit/s or larger is used.

10. A cable with a connector comprising:
a transmission cable having a plurality of differential signal transmission cables; and
connectors provided on both ends of the transmission cable,
wherein each of the differential signal transmission cables has:
two signal conductors;
an insulator for covering the signal conductors; and
a shield tape wound around the insulator in longitudinal wrapping,
the shield tape comprises a first overlapping region and a second overlapping region which overlap each other on both ends of the shield tape in a direction of the winding around the insulator,
the first overlapping region of the shield tape is covered with the second overlapping region,
a first tangent line tangent to a first signal conductor is orthogonal to a line passing through centers of the two signal conductors, the first tangent line is positioned at radially outside of the first signal conductor, and an end of the first overlapping region is positioned at outside of the first tangent line throughout the whole length of the cable,
a third tangent line tangent to the first signal conductor and orthogonal to the first tangent line is positioned at radially outside of the first signal conductor on a side of the first signal conductor adjacent to the first and second overlapping regions,
the end of the first overlapping region is positioned between the first tangent line and the third tangent line, and
the two signal conductors are positioned radially outward of any other signal conductors along the line passing through the centers of the two signal conductors in each of the differential signal transmission cables.

11. The cable with the connector according to claim 10, wherein, a second tangent line tangent to a second signal conductor is orthogonal to the line passing through the centers of the two signal conductors, the second tangent line is positioned at radially outside of the second signal conductor, and an end of the second overlapping region is positioned at outside of the second tangent line between the second tangent line and the third tangent line.

12. The cable with the connector according to claim 10, wherein, at a midpoint of a line segment connecting between the centers of the two signal conductors, the first overlapping region and the second overlapping region cross a line which is orthogonal to the line segment.

13. The cable with the connector according to claim 10,
wherein the first overlapping region and the second overlapping region do not cross the line passing through the centers of the two signal conductors.

14. The cable with the connector according to claim 10,
wherein the insulator collectively covers the two signal conductors.

15. The cable with the connector according to claim 14,
wherein a gap between the insulator and the shield tape is formed in only the end of the first overlapping region.

16. The cable with the connector according to claim 15,
wherein a drain wire is devoid between the insulator and the shield tape.

17. The cable with the connector according to claim 10, further has an insulating tape wound around the shield tape in spiral wrapping.

18. The cable with the connector according to claim 10,
wherein a transmission rate of 10 Gbit/s or larger is used.

* * * * *